May 13, 1930. R. B. BENJAMIN 1,758,642
PANEL BOARD CONSTRUCTION
Filed Feb. 7, 1925 3 Sheets-Sheet 1
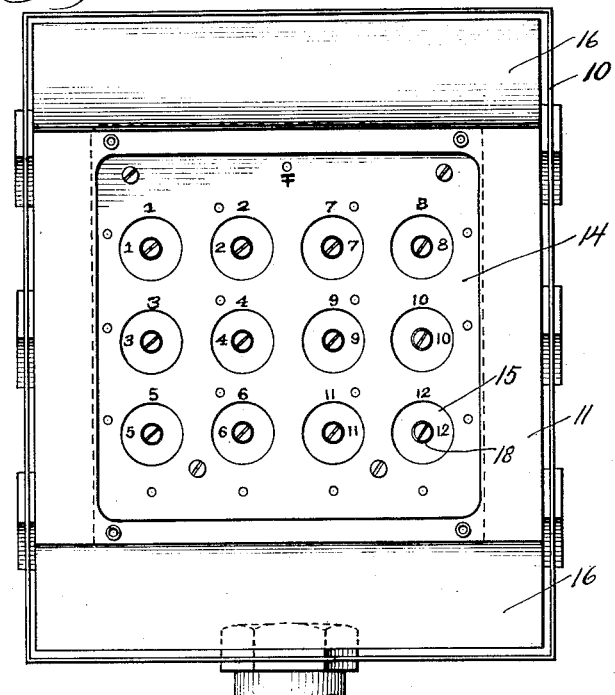
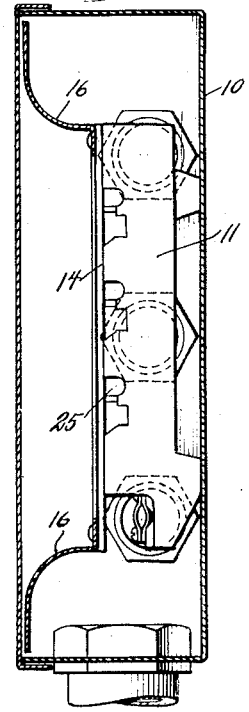
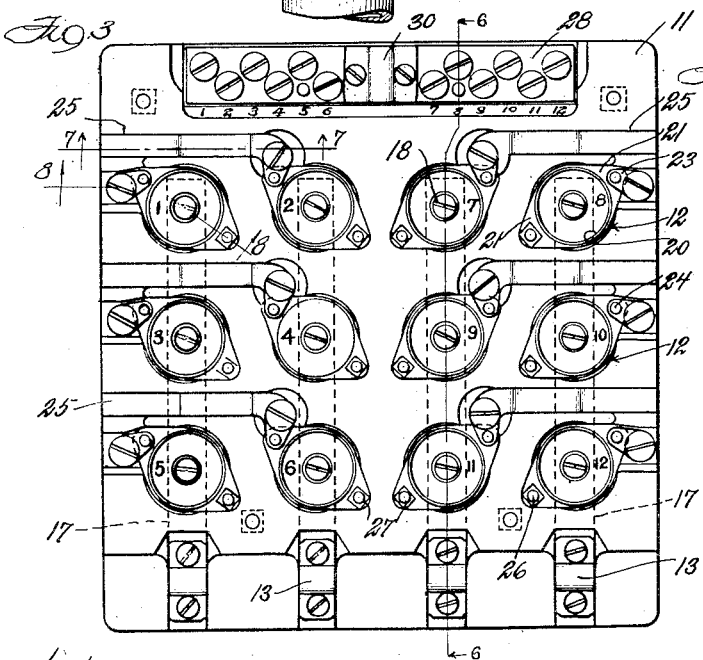
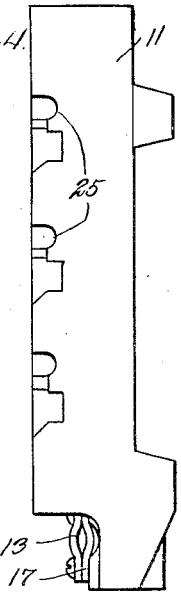
Inventor
Reuben B. Benjamin May 13, 1930.  R. B. BENJAMIN  1,758,642
PANEL BOARD CONSTRUCTION
Filed Feb. 7, 1925  3 Sheets-Sheet 2
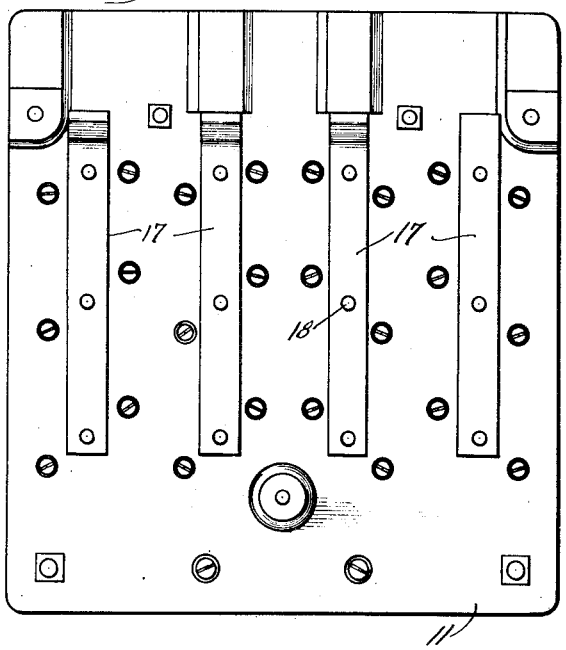
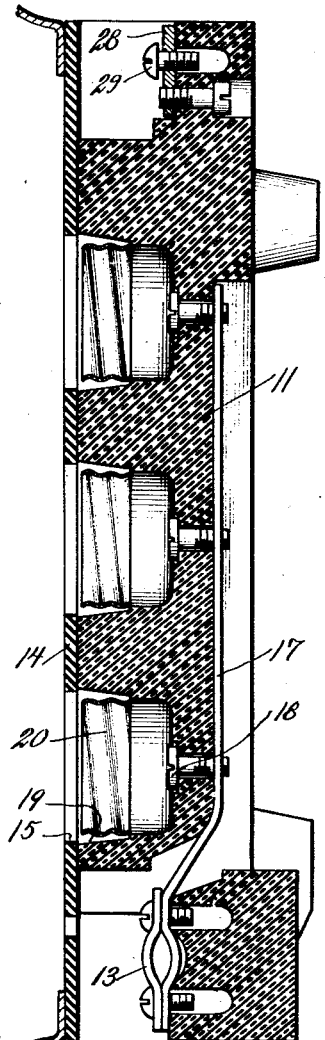
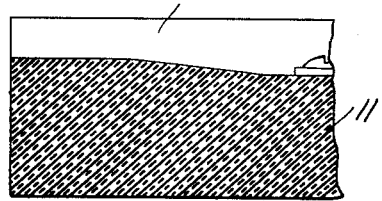
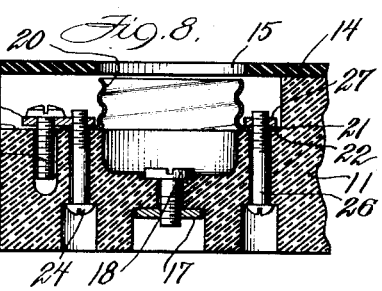
Inventor:
Reuben B. Benjamin
by Jones, Addington, Ames & Seibold
Attys.

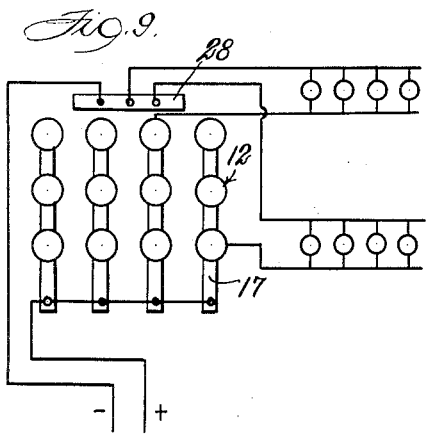
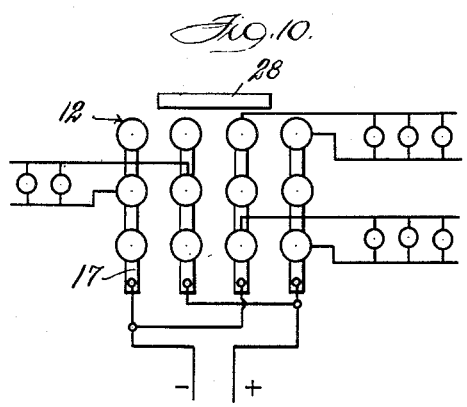
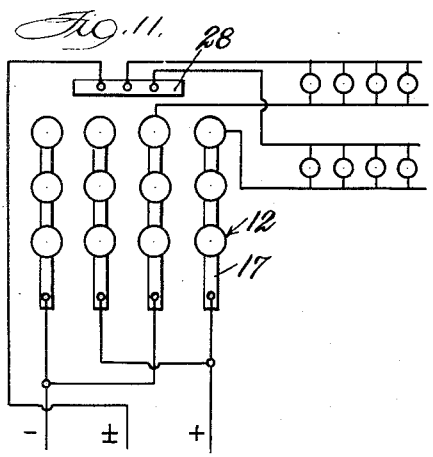
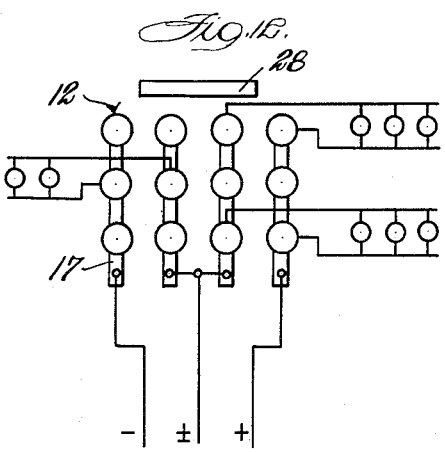
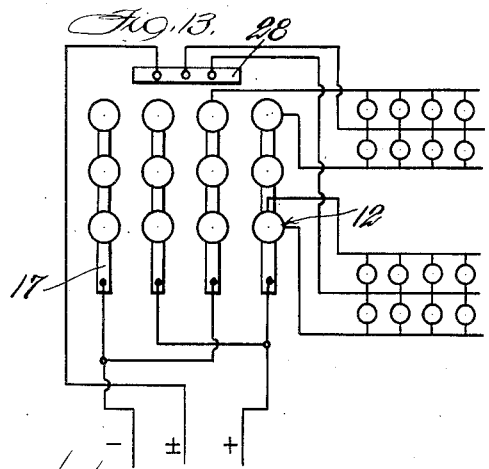
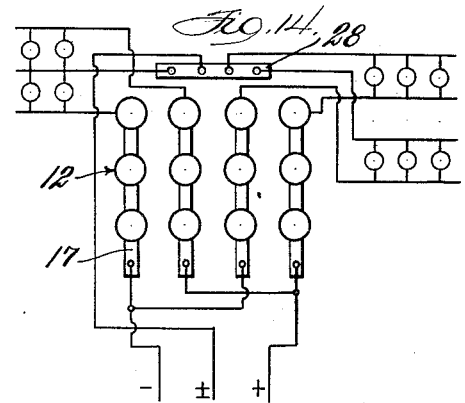

Patented May 13, 1930

1,758,642

UNITED STATES PATENT OFFICE

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS

PANEL-BOARD CONSTRUCTION

Application filed February 7, 1925. Serial No. 7,462.

My invention relates to panel board construction.

One of the objects of my invention is to provide a panel board construction which will be simple and compact and which will permit a large number of different circuit connections.

Further objects will appear from the description and claims.

In the drawings, in which my invention is illustrated,

Figure 1 is a front view of a panel board construction;

Fig. 2 is a vertical sectional view of Fig. 1;

Fig. 3 is a front view of the panel board removed from the box;

Fig. 4 is an edge view of Fig. 3;

Fig. 5 is a back view of Fig. 3;

Fig. 6 is a section on the line 6—6 of Fig. 3;

Fig. 7 is a section on the line 7—7 of Fig. 3;

Fig. 8 is a section on the line 8—8 of Fig. 3;

Fig. 9 is a diagram of one form of circuit connections;

Fig. 10 is a diagram of another form of circuit connections;

Fig. 11 is a diagram of another form of circuit connections;

Fig. 12 is a diagram of another form of circuit connections;

Fig. 13 is a diagram of another form of circuit connections;

Fig. 14 is a diagram of still another form of circuit connections.

Referring now to the drawings in detail, the construction shown comprises a sheet metal box 10, an insulating base 11 in the box provided with a plurality of fuse receptacles 12, binding terminals for the branch wiring and clips 13 of the main line connections. An apertured cover 14 of insulating sheet material is provided in front of the insulating base, the apertures 15 permitting access to the fuse receptacles and the cover serving to house and protect certain of the electrical connections. Curved sheet metal housing members 16 are secured to the upper and lower edges of this insulating cover, these housing members together with the cooperating parts of the box providing wiring gutters for the main and branch wires.

The panel board is shown as provided for four vertical rows of fuse receptacles. A bus bar 17 is provided for each row, the center contact screws 18 of the fuse receptacles extending through openings in the insulating base and being threaded into these bus bars. The clips 13 for the main power wires are secured to these bus bars.

The insulating base is provided with deep pockets or recesses 19 to receive the short threaded shell contacts 20. The lower inner edges of these threaded shell contacts are located a substantial distance above or in front of the center contacts, to lessen the danger of short circuiting between the center and shell contacts. Each threaded shell contact is provided with a pair of outwardly extending flange portions 21 which rest on shoulders 22 on the insulating base. Each threaded shell contact is provided with a binding plate 23 held against one of the flanges by means of a screw 24 extending through registering openings in the insulated base and flange and threaded into the binding plate, the binding screw 24ª is threaded into this binding plate 23.

The front face of the insulating base is provided with deep channels 25 leading from the edges of the base past the outer rows of fuse receptacles to the binding terminals for the threaded shell contacts of the inner rows of fuse receptacles. The threaded shell contacts are held in place on the insulating base by means of the screws 24 previously referred to, and other screws 26 threaded into nuts 27 engaging the other flanges of the threaded shell contacts.

In case it is not necessary to provide fuses for the branch connections, these may all be connected to a common binding plate 28 having a plurality of binding screws 29 for the branch connections and a binding clip 30 for the main line connection.

Figure 9 shows diagrammatically the connections for a two-wire main line, two wire branch circuit with fuses for the positive branch connections. Here all four of the bus bars 17 are connected with the positive main line and the negative main line is connected with the common binding plate 28. The positive branch wires are connected with the binding terminals for the fuse receptacles and the negative branch wires are connected with the binding screws of the common binding plate 28.

Figure 10 shows a two-wire, main line two-wire branch circuit with fuses for both sides of the branches. Here the first and third bus bars are connected with the negative main line and the second and fourth bus bars with the positive main line. The negative branch wires may be connected with any of the fuse receptacles of the first and third bus bars and the positive branch bars may be connected with any of the fuse receptacles of the second and fourth bus bars. In this form the common binding plate 28 is not used.

Figure 11 shows a three-wire, main two-wire branch circuit with fuses on only one side of the branch circuits. Here the neutral main connection is with the common binding plate, the negative main connection is with the first and third bus bars and the positive main connection is with the second and fourth bus bars.

Figure 12 shows a three-wire main, two-wire branch circuit with fuses in both sides of the branch circuits. Here the main neutral connection is with the second and third bus bar, the negative connection being with the first bus bar and the positive connection being with the fourth bus bar.

Figure 13 shows a three-wire main circuit with fuses only on the potential side of the branch circuits. Here the negative main connection is with the first and third bus bar, the positive with the second and fourth bus bar, and the neutral with the common binding plate.

Figure 14 shows a three-wire main circuit from which either three or two wire branch circuits may be derived. Here the negative main line is connected with the first and third bus bar connection, the neutral with the common binding plate and the positive with the second and fourth bus bar. In this circuit fuses are provided only on the potential side of the branch circuits.

I claim:

1. A panel board construction comprising an integral insulating base having plug receiving recesses therein, each recess having shoulders intermediate the top and bottom thereof, a short threaded shell contact in the outer part of each recess having flange portions seated on said shoulders and extending outwardly from the shell portion, the outer face of said insulating base extending toward the front substantially as far as the outer edge of said shell contacts, means cooperating with said flange portions for securing the shell to the base and center contacts in said recesses substantially below the level of said shoulders.

2. A panel board construction comprising an integral insulating base having plug receiving recesses therein, each recess having shoulders intermediate the top and bottom thereof, a short threaded shell contact in the outer part of each recess having flange portions seated on said shoulders and extending outwardly from the shell portion, the outer face of said insulating base extending toward the front substantially as far as the outer edge of said shell contacts, means cooperating with said flange portions for securing the shell to the base, and center contacts in said recesses substantially below the level of said shoulders, wiring terminals for the shell contacts adjacent said flanges, said base being provided with passages for the branch wires leading from said wiring terminals to the edge of the base.

3. A panel board construction comprising an integral insulating base having plug receiving recesses therein, each recess having shoulders intermediate the top and bottom thereof, a short threaded shell contact in the outer part of each recess having flange portions seated on said shoulders and extending outwardly from the shell portion, the outer face of said insulating base extending toward the front substantially as far as the outer edge of said shell contacts, means cooperating with said flange portions for securing the shell to the base, and center contacts in said recesses substantially below the level of said shoulders, and an insulating cover in front of said insulating base having openings for the insertion of plugs in alignment with said recesses.

4. A panel board construction comprising an integral insulating base having plug receiving recesses therein, each recess having shoulders intermediate the top and bottom thereof, a short threaded shell contact in the outer part of each recess having flange portions seated on said shoulders and extending outwardly from the shell portion, the outer face of said insulating base extending toward the front substantially as far as the outer edge of said shell contacts, one of said flanges serving as a conductor for the shell contact, and center contacts in said recesses substantially below the level of said shoulders.

In witness whereof, I have hereunto subscribed my name.

REUBEN B. BENJAMIN.